(12) United States Patent
Kariya

(10) Patent No.: US 12,397,855 B1
(45) Date of Patent: Aug. 26, 2025

(54) STEERING KNUCKLE CASTING AND STEERING KNUCKLE

(71) Applicant: HONDA FOUNDRY CO., LTD., Kawagoe (JP)

(72) Inventor: Tomoichiro Kariya, Kawagoe (JP)

(73) Assignee: Honda Foundry Co., Ltd., Saitama (JP)

( * ) Notice: Subject to any disclaimer, the term of this patent is extended or adjusted under 35 U.S.C. 154(b) by 0 days.

(21) Appl. No.: 18/703,826

(22) PCT Filed: Jun. 1, 2022

(86) PCT No.: PCT/JP2022/022277
§ 371 (c)(1),
(2) Date: Mar. 3, 2025

(87) PCT Pub. No.: WO2023/105819
PCT Pub. Date: Jun. 15, 2023

(30) Foreign Application Priority Data

Dec. 10, 2021 (JP) ................. 2021-200582

(51) Int. Cl.
*B62D 7/18* (2006.01)
*B22D 25/02* (2006.01)

(52) U.S. Cl.
CPC ............. *B62D 7/18* (2013.01); *B22D 25/02* (2013.01)

(58) Field of Classification Search
CPC .................. B62D 7/18; B22D 25/02
See application file for complete search history.

(56) References Cited

U.S. PATENT DOCUMENTS

| | | | | |
|---|---|---|---|---|
| 6,799,811 | B1* | 10/2004 | Dauber | B62D 7/18 |
| | | | | 301/124.1 |
| 11,021,187 | B2* | 6/2021 | Johnson | B22D 25/02 |
| 11,745,795 | B2* | 9/2023 | Foti | B62D 7/16 |
| | | | | 403/135 |
| 11,780,495 | B2* | 10/2023 | Reddehase | B62D 7/18 |
| | | | | 280/93.512 |
| 12,116,068 | B2* | 10/2024 | Gruber | B60B 27/0052 |
| 2019/0003022 | A1* | 1/2019 | Cakrawala | B22C 9/22 |

(Continued)

FOREIGN PATENT DOCUMENTS

| | | |
|---|---|---|
| CN | 202783360 U | 3/2013 |
| CN | 204197009 U | 3/2015 |

(Continued)

*Primary Examiner* — Toan C To
(74) *Attorney, Agent, or Firm* — Carrier, Shende & Associates P.C.; Fulchand P. Shende; Joseph P. Carrier

(57) ABSTRACT

A steering knuckle casting 20 includes a plan portion 22 and a product portion 23 formed along a flow of molten metal 21. The product portion 23 includes an intermediate portion 26, a first fastening portion 27 integrally formed at one end of the intermediate portion 26, a second fastening portion 28 integrally formed at the other end of the intermediate portion 26, and a first rib 31 and a second rib 32 integrally formed in the intermediate portion 26 to extend from the first fastening portion 27 to the second fastening portion 28. The first rib 31 and the second rib 32 are not parallel to each other, and are disposed in a V shape such that a rib spacing W1 on a first fastening portion 27 side is narrower than a rib spacing W2 on a second fastening portion 28 side.

5 Claims, 10 Drawing Sheets

(56) References Cited

U.S. PATENT DOCUMENTS

2020/0047794 A1\* 2/2020 Fleury ................... B29C 43/003
2020/0223272 A1   7/2020 Hosoi

FOREIGN PATENT DOCUMENTS

| JP | 2006-007802 A | 1/2006 |
| JP | 2017-074863 A | 4/2017 |
| JP | 2020-111173 A | 7/2020 |
| KR | 2018-0110333 A | 10/2018 |

\* cited by examiner

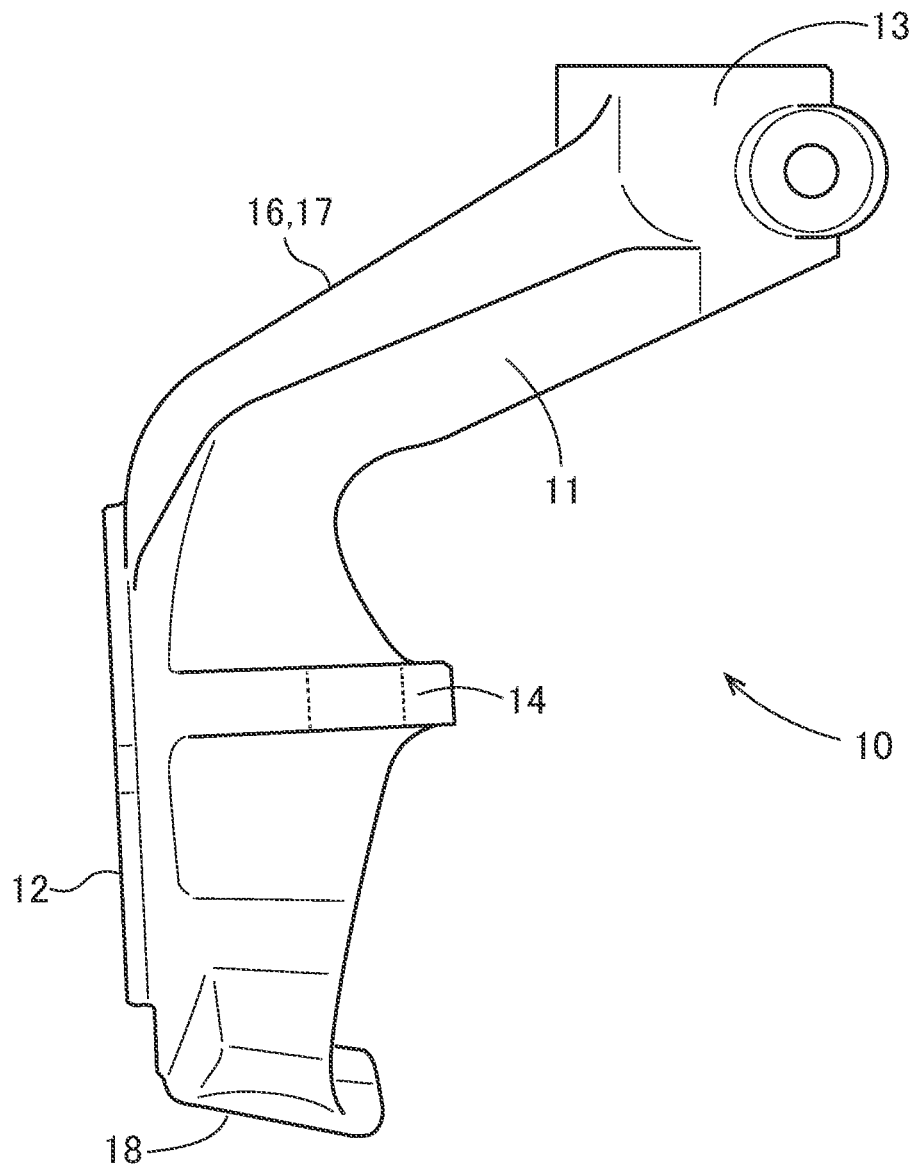

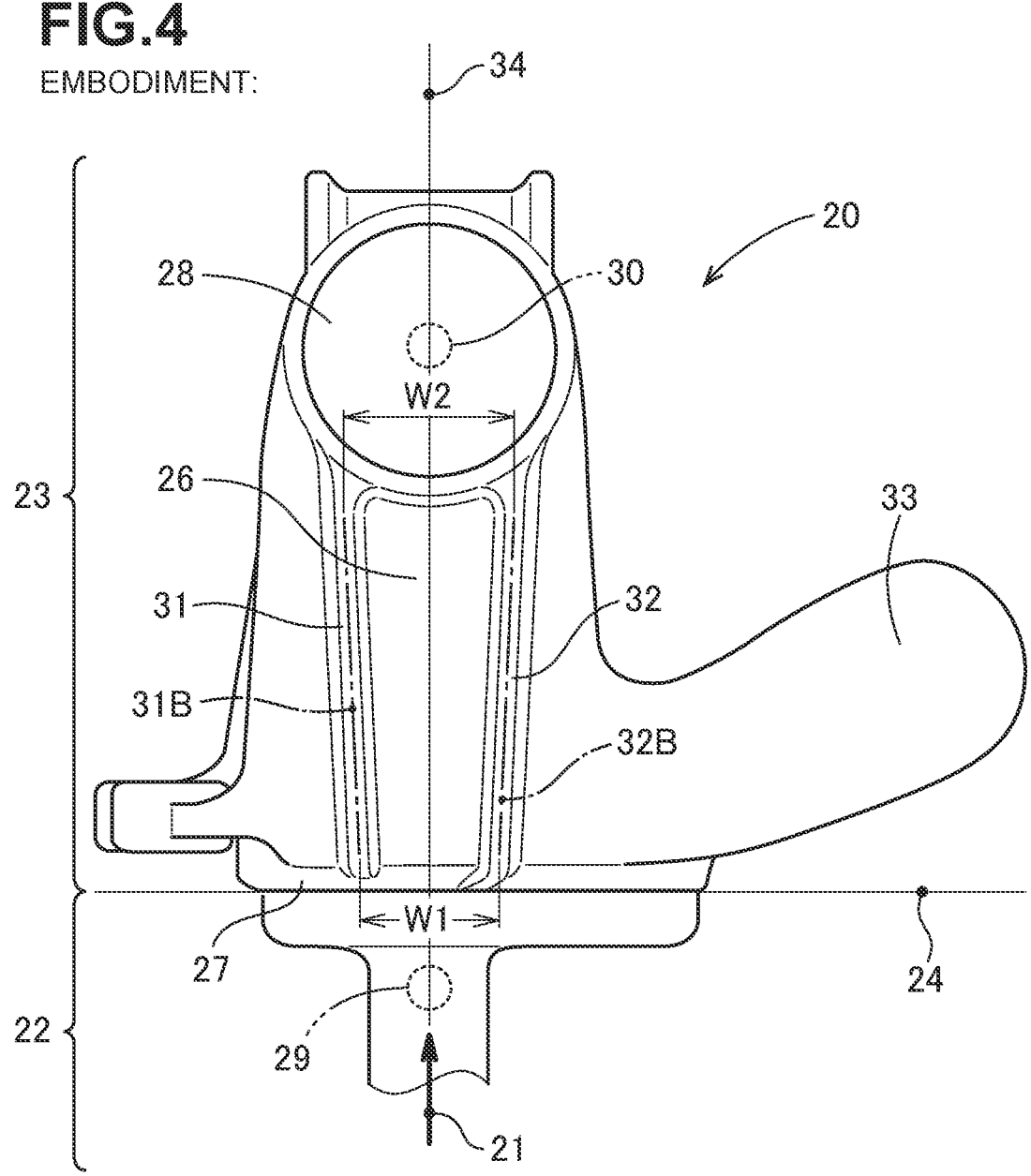

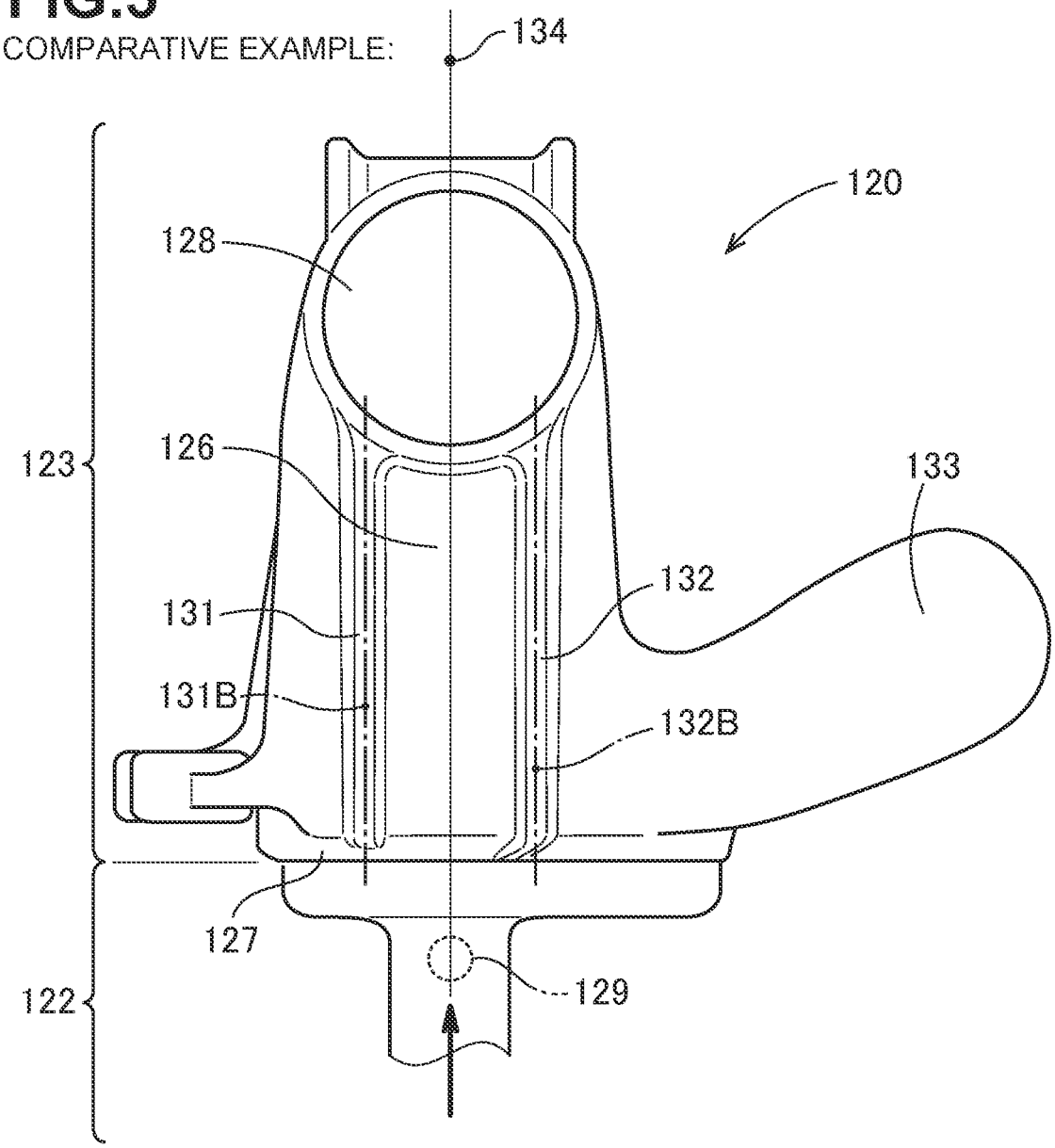

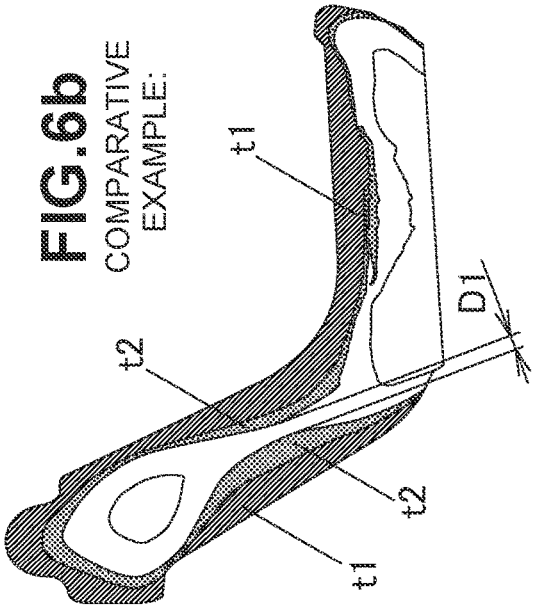
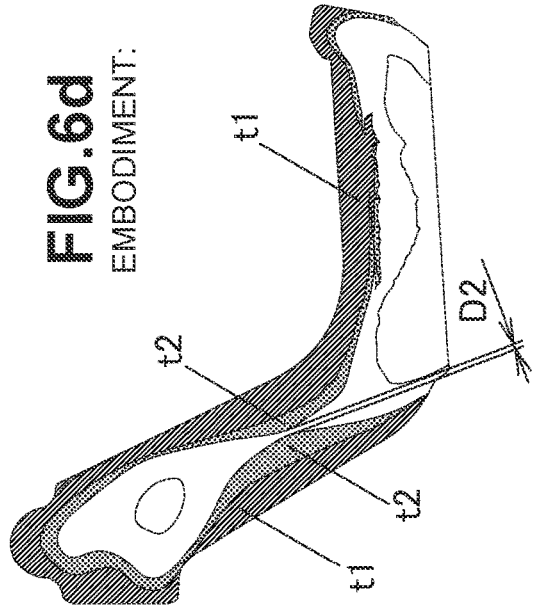
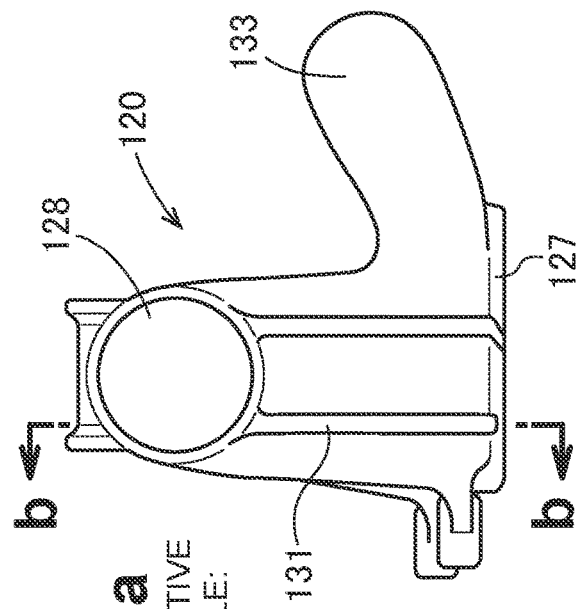
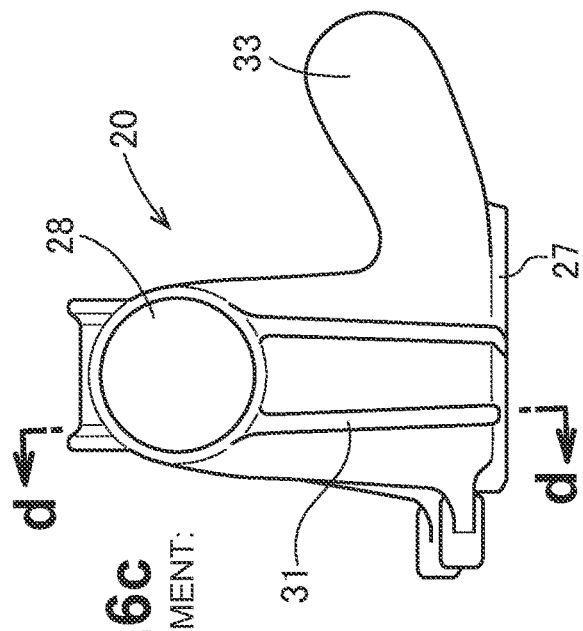

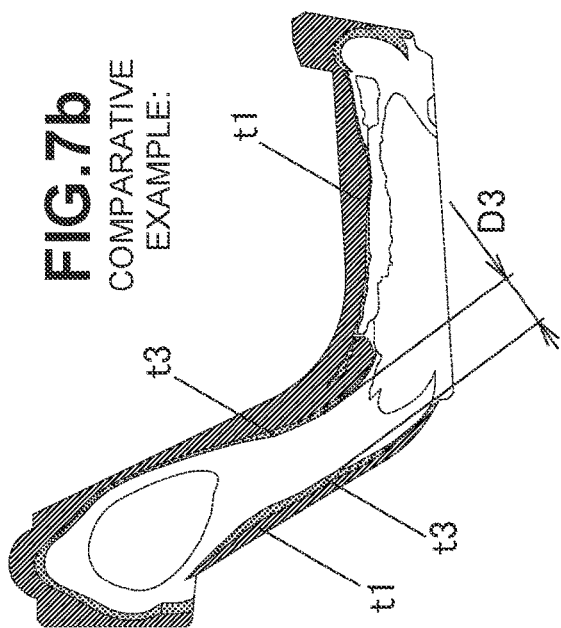
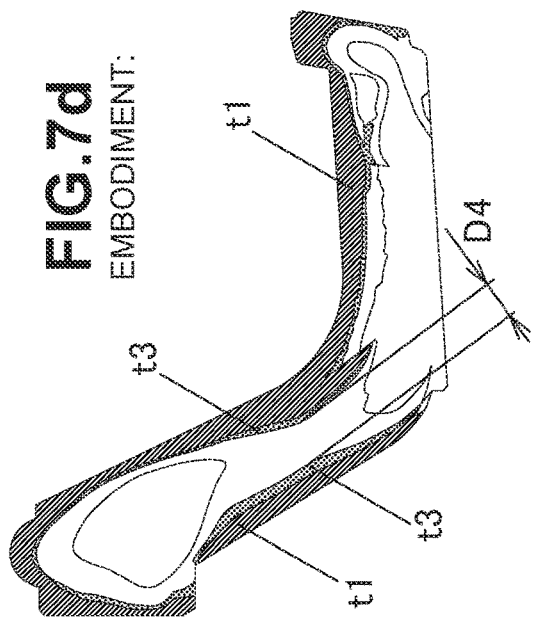
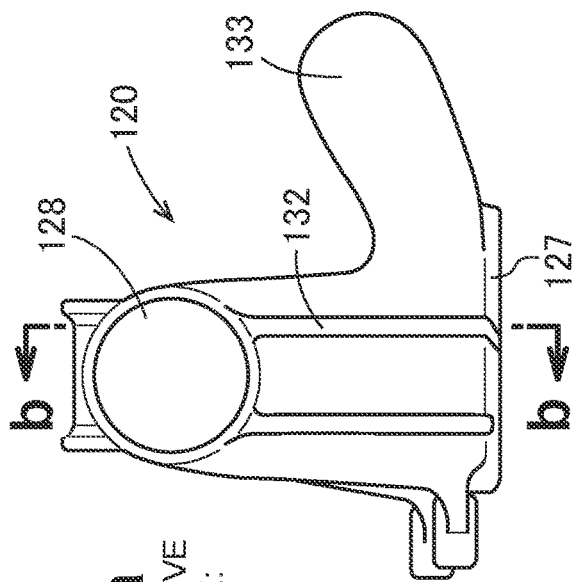
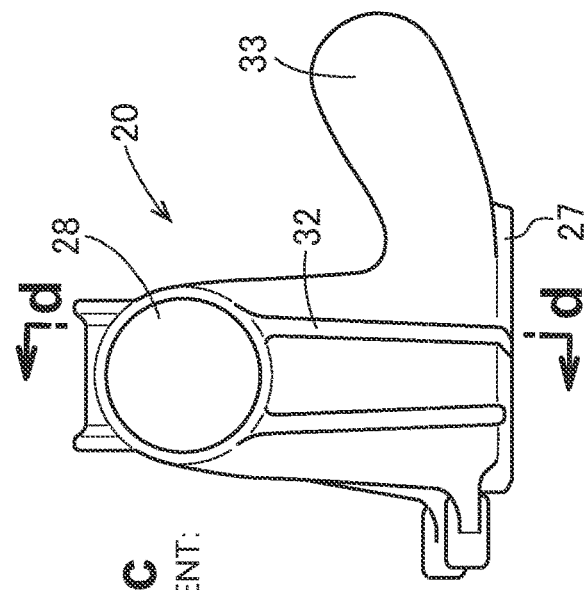

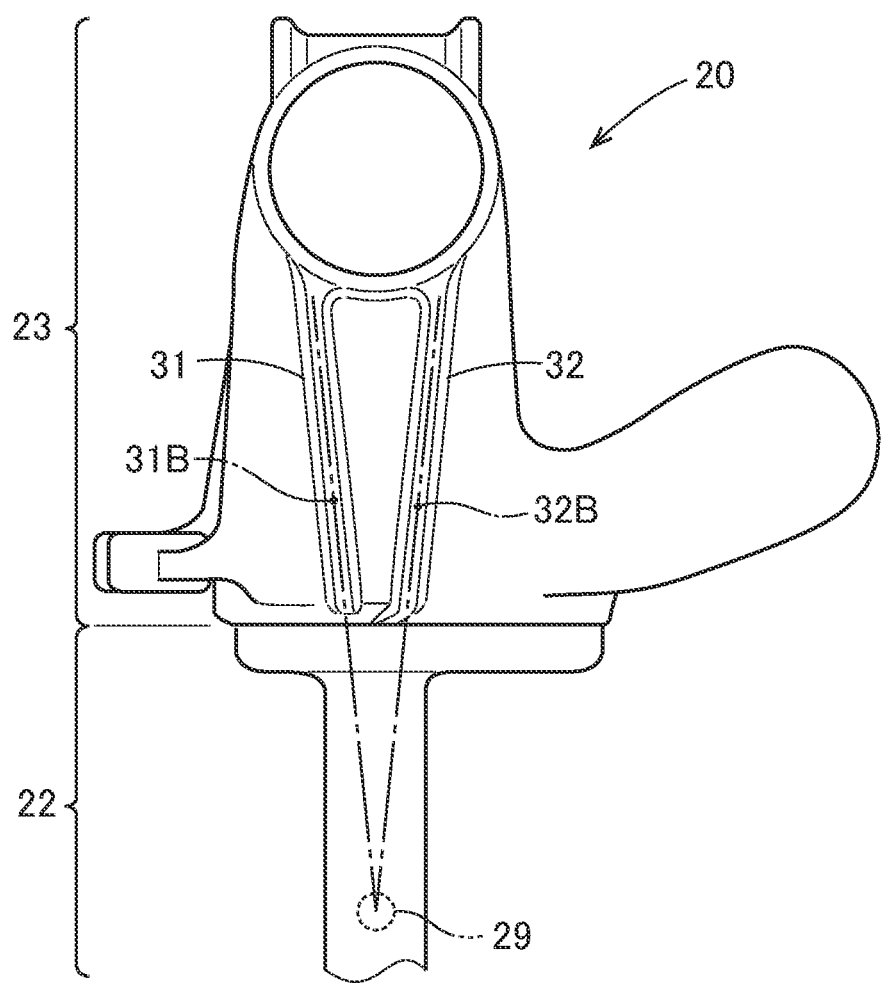

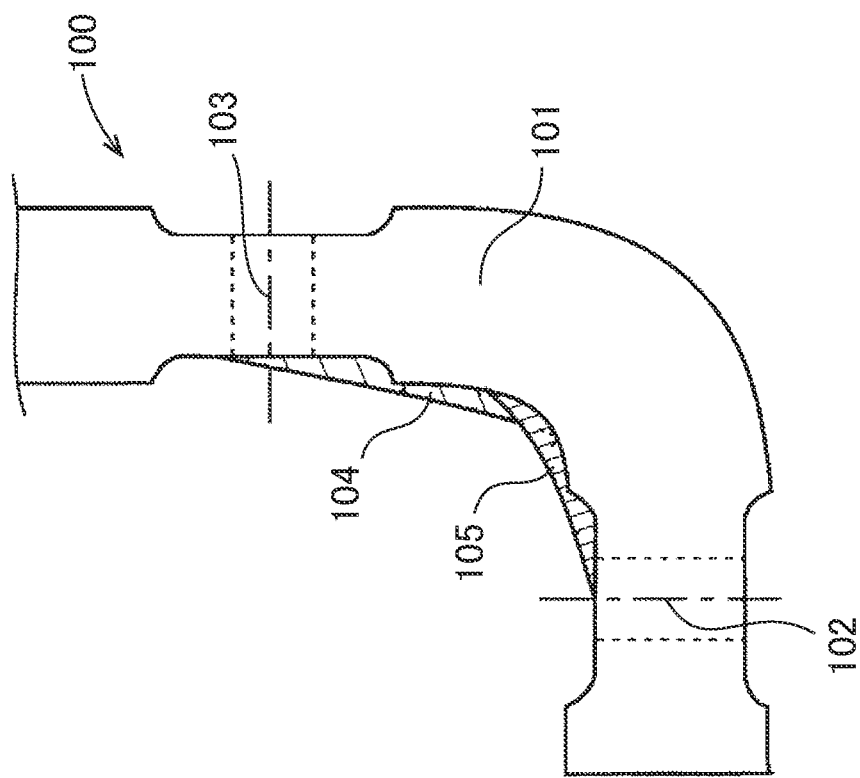
FIG.9b (CONVENTIONAL TECHNIQUE)
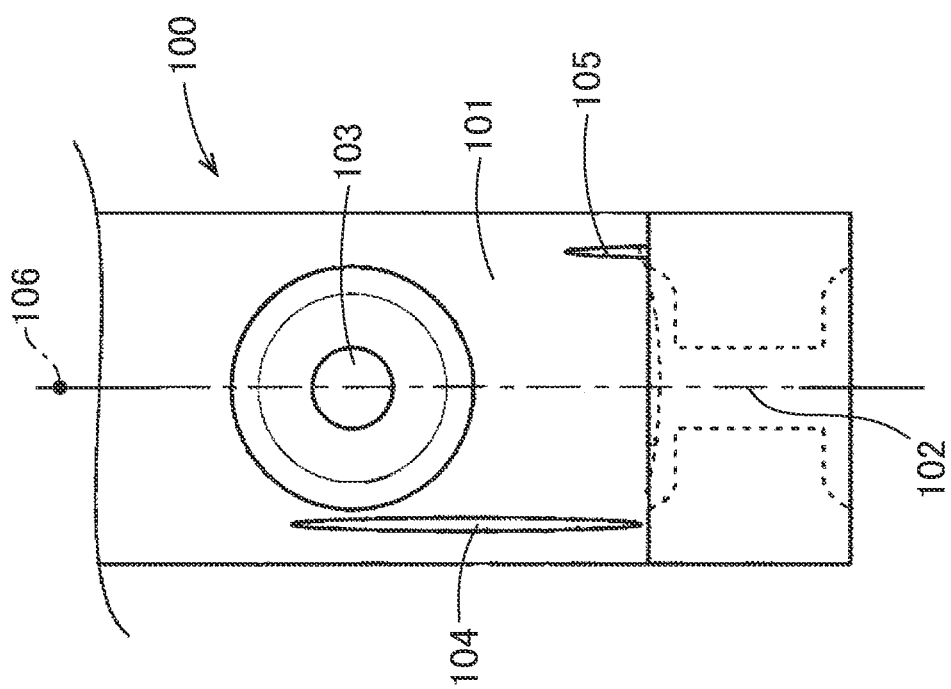
FIG.9a (CONVENTIONAL TECHNIQUE)

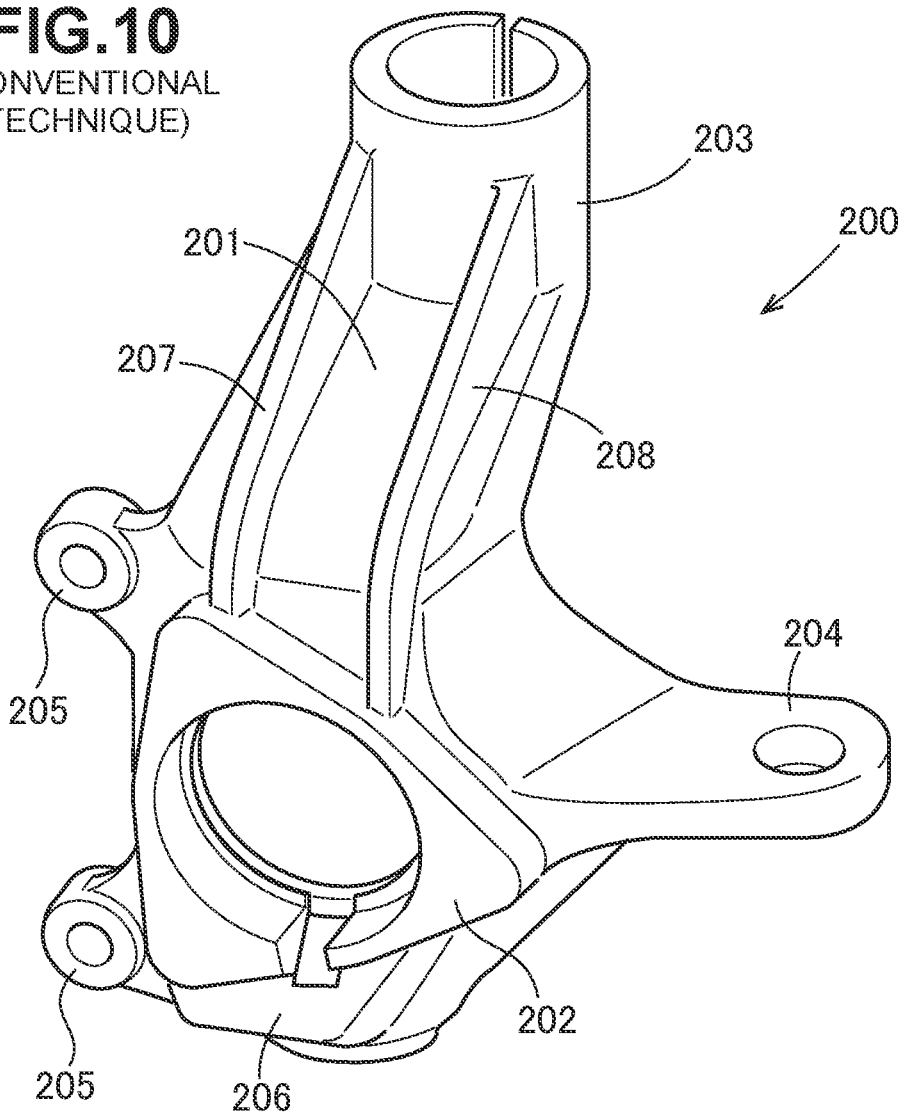

STEERING KNUCKLE CASTING AND STEERING KNUCKLE

TECHNICAL FIELD

The present invention relates to a steering knuckle casting and a steering knuckle. In the invention, the steering knuckle as a product (product steering knuckle) is simply referred to as a "steering knuckle", and is distinguished from a steering knuckle casting.

BACKGROUND ART

A member referred to as a steering knuckle that holds a wheel is attached to a vehicle such as a passenger car.

Such a steering knuckle including a reinforcing rib is known (for example, refer to Patent Document 1 (FIG. 2)).

Patent Document 1 will be described based on the following drawing.

FIG. 9 is a front view and a right side view of a conventional steering knuckle.

As shown in FIG. 9(a), a steering knuckle 100 includes, as basic elements, an intermediate portion 101; a first connecting portion 102 formed at one end of the intermediate portion 101; and a second connecting portion 103 formed at the other end of the intermediate portion 101.

Fastened members such as a lower arm, an upper arm, a brake carrier, and a link member are fastened to the first connecting portion 102 and the second connecting portion 103 using bolts (Patent Document 1, paragraph 0013).

As shown in FIG. 9(b), the steering knuckle 100 is provided with a first rib 104 and a second rib 105.

As shown in FIG. 9(a), when a line passing through the center of the first connecting portion 102 and the center of the second connecting portion 103 is referred to as a center line 106, the first rib 104 and the second rib 105 are provided to be parallel to the center line 106.

A steering knuckle 200 having a form different from that in Patent Document 1 will be described based on FIG. 10.

As shown in FIG. 10, the conventional steering knuckle 200 includes a product intermediate portion 201; an axle fastening portion 202 integrally formed at one end of the product intermediate portion 201; a damper fastening portion 203 integrally formed at the other end of the product intermediate portion 201; a rod fastening portion 204 formed to project from the axle fastening portion 202 toward the right in the drawing; a brake fastening portion 205 formed to project from the axle fastening portion 202 toward the left in the drawing; and a lower arm fastening portion 206 formed to project from the axle fastening portion 202 toward the bottom in the drawing.

An axle is fastened to the axle fastening portion 202.

A damper is fastened to the damper fastening portion 203.

A steering tie rod is fastened to the rod fastening portion 204.

A brake carrier (brake caliper) is fastened to the brake fastening portion 205.

A lower arm is fastened to the lower arm fastening portion 206.

The present inventors attached ribs (a pair of reinforcing ribs parallel to each other), which are similar to those in Patent Document 1, to the steering knuckle 200.

Namely, a first reinforcing rib 207 and a second reinforcing rib 208 extending from the axle fastening portion 202 to the damper fastening portion 203 were integrally formed in the product intermediate portion 201.

The rigidity is improved by the first reinforcing rib 207 and the second reinforcing rib 208.

On the other hand, it was found that the castability (running of metal and solidification directionality) was sacrificed due to the first reinforcing rib 207 and the second reinforcing rib 208 being provided. The reason for this will be described in detail in a "comparative example" to be described later.

CITATION LIST

Patent Document

Patent Document 1: Japanese Unexamined Patent Publication No. 2017-74863

SUMMARY OF THE INVENTION

Problem to be Solved by the Invention

An object of the invention is to provide a technique of improving castability despite the fact that a first reinforcing rib and a second reinforcing rib are provided in a steering knuckle casting for the purpose of improving rigidity.

Means for Solving Problem

According to a first aspect of the invention, there is provided a steering knuckle casting from which a steering knuckle as a product is obtained by performing machining on the steering knuckle casting. The steering knuckle casting is a casting product including a plan portion and a product portion formed along a flow of molten metal, designed such that the product portion solidifies and then the plan portion solidifies, and obtained by separating the plan portion from the product portion after the solidification, sending the plan portion back to a remelting process, and performing the machining on the product portion. The product portion includes an intermediate portion, a first fastening portion integrally formed at one end of the intermediate portion and formed on a plan portion side, a second fastening portion integrally formed at the other end of the intermediate portion, and a first rib and a second rib integrally formed in the intermediate portion to extend from the first fastening portion to the second fastening portion. The first rib and the second rib are not parallel to each other, and are disposed in a V shape such that a rib spacing on a first fastening portion side is narrower than a rib spacing on a second fastening portion side.

According to a second aspect of the invention, preferably, in the steering knuckle casting according to the first aspect, the plan portion includes a final solidification portion that is most delayed in the solidification, and an intersection point between a longitudinal axis of the first rib and a longitudinal axis of the second rib overlaps the final solidification portion.

According to a third aspect of the invention, preferably, in the steering knuckle casting according to the first or second aspect, the first fastening portion is a portion to which an axle is fastened, and the second fastening portion is a portion to which a damper is fastened.

According to a fourth aspect of the invention, there is a steering knuckle including: a product intermediate portion; an axle fastening portion which is integrally formed at one end of the product intermediate portion, and to which an axle is fastened; a damper fastening portion which is integrally formed at the other end of the product intermediate portion, and to which a damper is fastened; and a first reinforcing rib and a second reinforcing rib integrally formed in the product intermediate portion to extend from the axle fastening portion to the damper fastening portion. The first reinforcing rib and the second reinforcing rib are not parallel to each other, and are disposed in a V shape such that a rib spacing on an axle fastening portion side is narrower than a rib spacing on a damper fastening portion side.

Effect of the Invention

In the first aspect of the invention, the first rib and the second rib are disposed in a V shape such that the first rib and the second rib are directed toward the plan portion.

After the filling of the molten metal is completed in a casting process, heat is removed by a mold, and the solidification of the molten metal starts. At this time, the unsolidified molten metal moves toward the plan portion through the first rib and the second rib. According to the invention, since the first rib and the second rib are directed toward the plan portion, the unsolidified molten metal smoothly moves toward the plan portion. As a result, solidification directionality is significantly improved. Since the solidification directionality is improved, castability is improved.

Namely, according to the invention, a technique of improving the castability despite the fact that the first rib and the second rib are provided in the steering knuckle casting for the purpose of improving rigidity is provided.

In the second aspect of the invention, the intersection point between the longitudinal axis of the first rib and the longitudinal axis of the second rib overlaps the final solidification portion in the plan portion.

Since the unsolidified molten metal moves directly toward the final solidification portion, solidification directionality is further improved.

In the third aspect of the invention, the first rib and the second rib span between the portion to which the axle is fastened and the portion to which the damper is fastened.

Large bending due to an external force is applied between the portion to which the axle is fastened and the portion to which the damper is fastened. The first rib and the second rib are provided at such a portion to sufficiently increase the rigidity. Namely, sufficient rigidity can be given without increasing the thickness of the intermediate portion. As a result, a reduction in the thickness and weight of the steering knuckle can be easily achieved.

In the fourth aspect of the invention, the first reinforcing rib and the second reinforcing rib are disposed in a V shape in the steering knuckle.

Similarly to the first aspect, since the first reinforcing rib and the second reinforcing rib are directed toward the plan portion, the unsolidified molten metal smoothly moves toward the plan portion. As a result, solidification directionality is significantly improved. Since the solidification directionality is improved, castability is improved.

Namely, according to the invention, a technique of improving the castability despite the fact that the first reinforcing rib and the second reinforcing rib are provided in the steering knuckle for the purpose of improving rigidity is provided.

BRIEF DESCRIPTION OF DRAWINGS

FIG. 3 is a view from arrow 3 in FIG. 1 (a right side view of the steering knuckle);

FIG. 4 is a plan view of a steering knuckle casting according to the invention;

FIG. 5 is a plan view of a steering knuckle casting according to a comparative example;

FIGS. 6(a) to 6(d) are views describing the solidification time of a first reinforcing rib;

FIGS. 7(a) to 7(d) are views describing the solidification time of a second reinforcing rib;

FIG. 8 is a view describing a more preferred embodiment;

FIG. 9(a) is a front view of a conventional steering knuckle, and FIG. 9(b) is a right side view of the conventional steering knuckle; and FIG. 10 is a perspective view of another conventional steering knuckle.

MODE(S) FOR CARRYING OUT THE INVENTION

An embodiment of the invention will be described below based on the accompanying drawings.

EMBODIMENT

Figure 1:
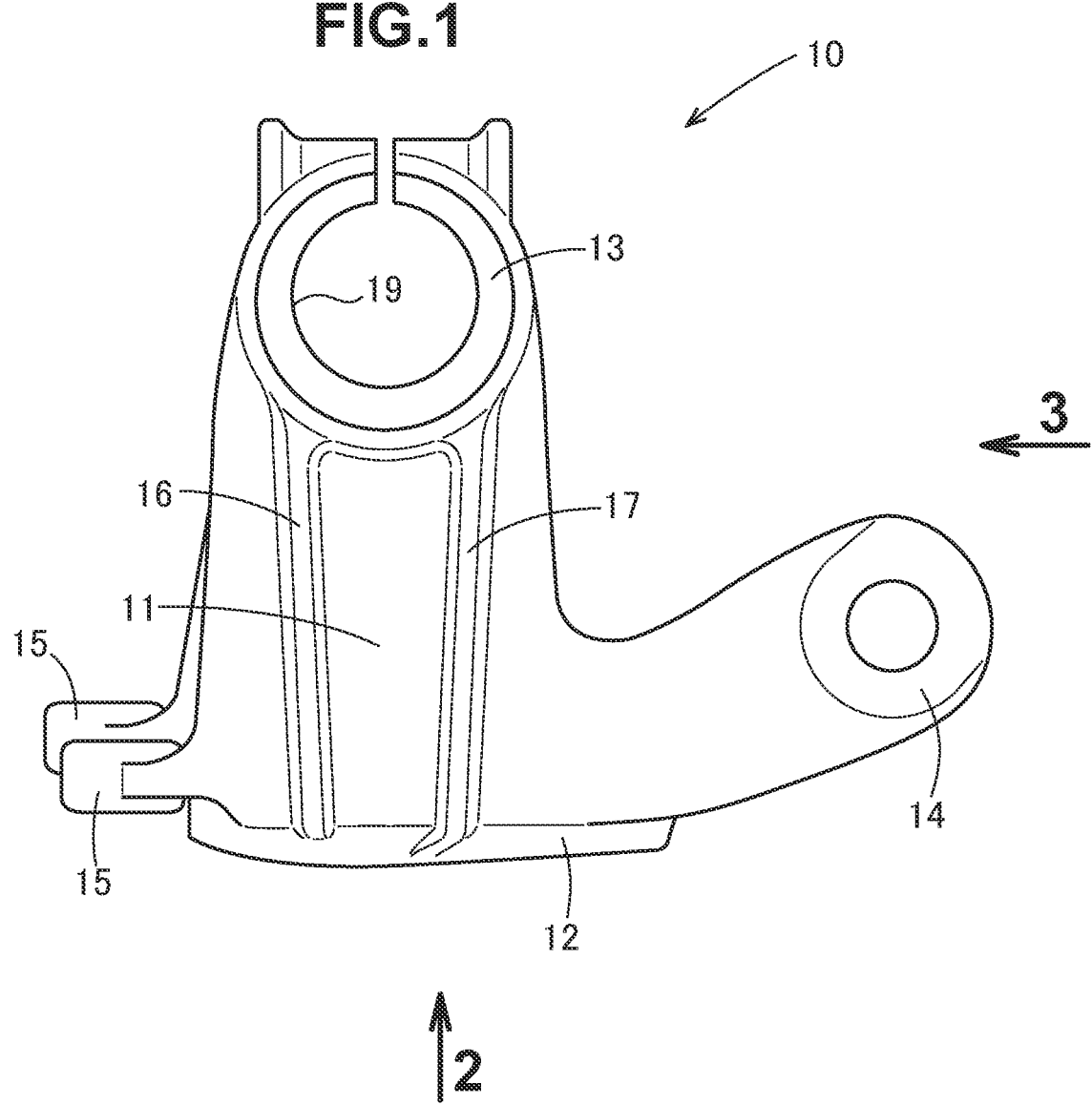
FIG. 1 is a plan view of a steering knuckle according to the invention.
Figure 2:
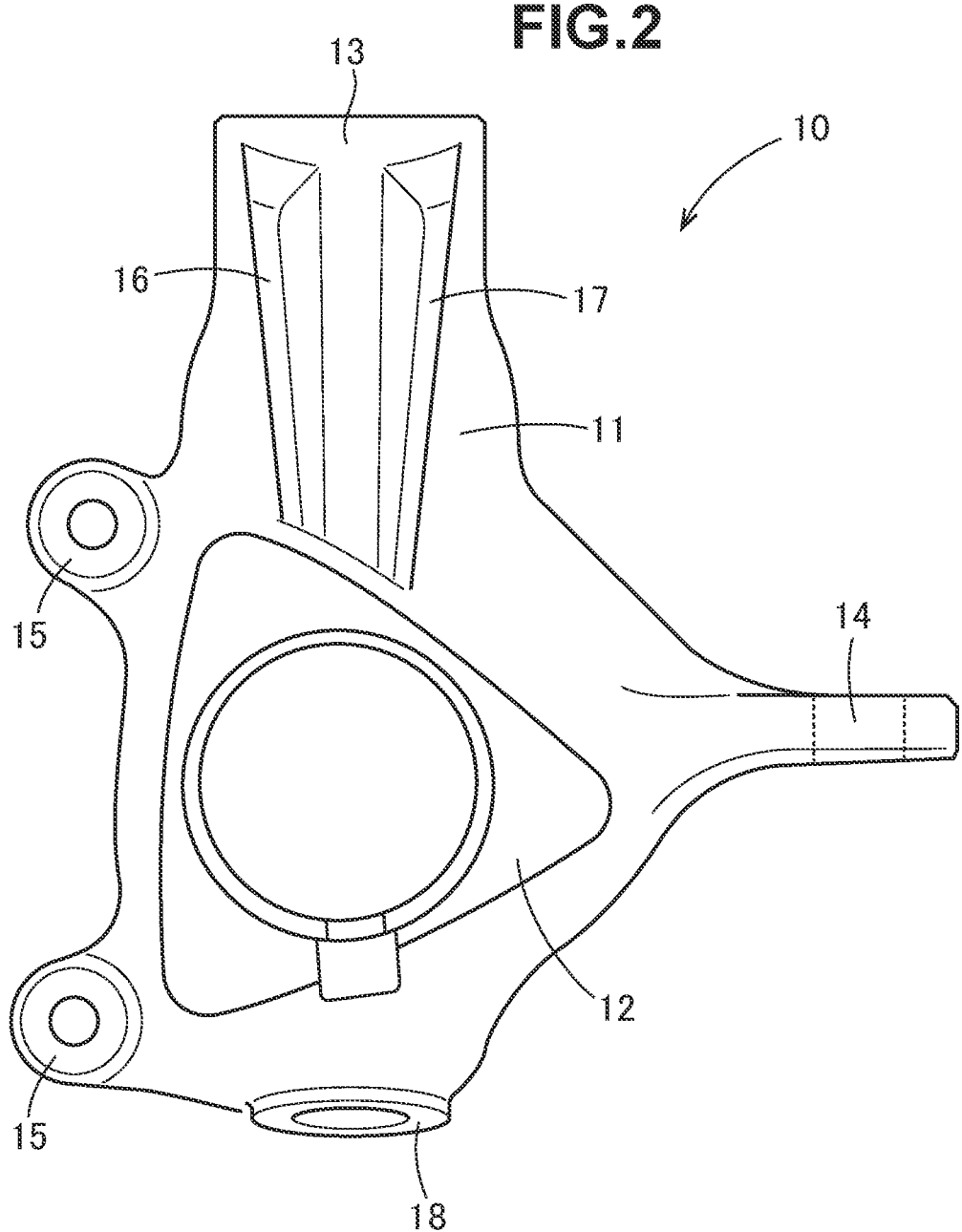
FIG. 2 is a view from arrow 2 in FIG. 1 (a front view of the steering knuckle)

A steering knuckle 10 as a product is shown in FIG. 1 to FIG. 3. The steering knuckle 10 is obtained by performing machining or the like on a steering knuckle casting.

As shown in FIG. 1, the steering knuckle 10 includes a product intermediate portion 11; an axle fastening portion 12 integrally formed at one end of the product intermediate portion 11; a damper fastening portion 13 integrally formed at the other end of the product intermediate portion 11; a rod fastening portion 14 formed to project from the axle fastening portion 12 toward the right in the drawing; and a brake fastening portion 15 formed to project from the axle fastening portion 12 toward the left in the drawing.

An axle is fastened to the axle fastening portion 12.

A machining hole 19 is formed in the damper fastening portion 13, and a damper is fastened to the machining hole 19.

A steering tie rod is fastened to the rod fastening portion 14.

A brake caliper is fastened to the brake fastening portion 15.

A first reinforcing rib 16 and a second reinforcing rib 17 are integrally formed in the product intermediate portion 11 to extend from the axle fastening portion 12 to the damper fastening portion 13. The first reinforcing rib 16 and the second reinforcing rib 17 are disposed non-parallel to each other, and are disposed in a V shape such that a rib spacing on an axle fastening portion side 12 is narrower than a rib spacing on a damper fastening portion side 13.

As shown in FIG. 2, the steering knuckle 10 integrally includes an arm fastening portion 18 at a lower portion thereof. A lower arm is fastened to the arm fastening portion 18. For other portions, the reference letters or numerals in FIG. 1 are used, and detailed description thereof will be omitted.

As shown in FIG. 3, the first reinforcing rib 16 and the second reinforcing rib 17 are integrally formed in the product intermediate portion 11 to extend from the axle fastening portion 12 to the damper fastening portion 13. For other portions, the reference letters or numerals in FIG. 1 are used, and detailed description thereof will be omitted.

A steering knuckle casting serving as an origin for the steering knuckle 10 described above will be described below.

As shown in FIG. 4, a steering knuckle casting 20 includes a plan portion 22 and a product portion 23 formed along the flow of molten metal 21. The product portion 23 solidifies, and then the plan portion 22 solidifies. The vicinity of a central portion of the plan portion 22 is a final solidification portion 29.

When solidification is completed, the plan portion 22 is separated from the product portion 23 along a separation line 24.

The plan portion 22 is sent back to a remelting process, and the product portion 23 is machined to obtain the steering knuckle 10 described in FIG. 1 to FIG. 3.

The product portion 23 includes an intermediate portion 26; a first fastening portion 27 integrally formed at one end (plan portion 22 side) of the intermediate portion 26; a second fastening portion 28 integrally formed at the other end of the intermediate portion 26; and a first rib 31 and a second rib 32 that are integrally formed in the intermediate portion 26 to extend from the first fastening portion 27 to the second fastening portion 28.

The first fastening portion 27 corresponds to a portion to which the axle is fastened (axle fastening portion 12 in FIG. 1), and the second fastening portion 28 corresponds to a portion to which the damper is fastened (damper fastening portion 13 in FIG. 1).

The product portion 23 further integrally includes a projecting portion 33 projecting from the intermediate portion 26 toward the right in the drawing. The rod fastening portion (reference numeral 14 in FIG. 1) is formed in the projecting portion 33, which projects, in a post-process.

A center line 34 is a line passing through the center of the first fastening portion 27 and the center of the second fastening portion 28.

The first rib 31 and the second rib 32 are not parallel to the center line 34, and are disposed in a V shape such that a rib spacing W1 on a first fastening portion 27 side is narrower than a rib spacing W2 on a second fastening portion 28 side.

Incidentally, in the embodiment, both the first rib 31 and the second rib 32 are made non-parallel to the center line 34; however, only one may be made non-parallel to the center line 34, and the other may be made parallel (including substantially parallel) to the center line 34. In short, the first rib 31 and the second rib 32 may be disposed in a V shape.

In order to examine the superiority of the first rib 31 and second rib 32 of the invention disposed in a V shape, a steering knuckle casting in which a pair of ribs are disposed parallel to each other is taken as a "comparative example".

As shown in FIG. 5, a steering knuckle casting 120 in the comparative example includes a plan portion 122 and a product portion 123.

The product portion 123 includes an intermediate portion 126; a first fastening portion 127; a second fastening portion 128; a first rib 131 and a second rib 132 that are integrally formed in the intermediate portion 126 to extend from the first fastening portion 127 to the second fastening portion 128; and a projecting portion 133.

The first rib 131 and the second rib 132 are parallel to a center line 134 passing through the center of the first fastening portion 127 and the center of the second fastening portion 128.

The steering knuckle casting 20 (embodiment) and the steering knuckle casting 120 (comparative example) described above will be compared to each other. This comparison will be described based on FIG. 6 and FIG. 7.

FIG. 6 is a view describing the solidification status of the first reinforcing rib.

FIG. 6(a) shows the steering knuckle casting 120 (comparative example), and FIG. 6(b) is a view describing solidification times in a cross section taken along line b-b of FIG. 6(a).

In FIG. 6(b), a solidification time t1 in areas with diagonal lines is 10 to 18 seconds. A solidification time t2 in areas with countless dots is 18 to 22 seconds.

Namely, in the intermediate portion including the first rib 131, solidification progresses (is directed) from left and right surface layers toward the center. A distance between the left area with the solidification time t2 and the right area with the solidification time t2 is denoted by D1.

FIG. 6(c) shows the steering knuckle casting 20 (embodiment), and FIG. 6(d) is a view describing solidification times in a cross section taken along line d-d of FIG. 6(c).

In FIG. 6(d), the solidification time t1 in areas with diagonal lines is 10 to 18 seconds. The solidification time t2 in areas with countless dots is 18 to 22 seconds.

Namely, in the intermediate portion including the first rib 31, solidification progresses (is directed) from left and right surface layers toward the center. A distance between the left area with the solidification time t2 and the right area with the solidification time t2 is denoted by D2.

The distance D2 is much smaller than the distance D1. In addition, in FIG. 6(d), the tips of the areas with the solidification time t2 form a V shape, and the division of the solidification direction is clear. On the other hand, in FIG. 6(b), the division of the solidification direction is not clear.

In FIG. 6(d), since the division of the solidification direction is clear, the unsolidified molten metal is pushed out to the first fastening portion 27 and the second fastening portion 28. As a result, a casting defect such as a cavity is less likely to remain in the first rib 31.

On the other hand, in FIG. 6(b), since the division of the solidification direction is not clear, a casting defect such as a cavity is likely to remain.

The above-described tendency will also be verified in FIG. 4.

In FIG. 4, after the filling of the molten metal 21 is completed in a casting process, heat is removed (cooled) by a mold, and the solidification of the molten metal 21 starts. The solidification of the molten metal 21 may be partially uneven depending on the shape of the product or the shape of the mold. In a final solidification portion, generally, a shrinkage cavity is likely to occur due to solidification shrinkage of the metal.

As described in FIG. 6(d), the unsolidified molten metal moves toward the first fastening portion 27 and the second fastening portion 28.

In FIG. 4, the molten metal moving toward the first fastening portion 27 moves toward the final solidification portion 29, and the molten metal moving toward the second fastening portion 28 moves toward the center of the second fastening portion 28. The center of the second fastening portion 28 becomes a delayed solidification portion 30 on a product side.

A shrinkage cavity is likely to occur in the final solidification portion 29 and the delayed solidification portion 30 on the product side. Since the solidification directionality is clear, portions where a shrinkage cavity occurs are limited to the final solidification portion 29 and the delayed solidification portion 30 on the product side.

Since the final solidification portion 29 is included in the plan portion 22 partitioned by a parting line 24, the final solidification portion 29 does not affect the product portion 23.

In addition, the delayed solidification portion 30 on the product side is removed when the machining hole (reference numeral 19 in FIG. 1) is machined.

Namely, solidification starts from the intermediate portion 26. As a result, by controlling the solidification directionality, a casting defect such as a shrinkage cavity is prevented from occurring in the product portion 23 including the intermediate portion 26, and as a result, the internal quality is improved, the strength is secured, the productivity is improved, and the castability is improved.

On the other hand, since the division of the solidification direction is not clear in the comparative example described in FIG. 6(a) and FIG. 6(b), the risk of a shrinkage cavity also occurring in the product portion remains compared to the embodiment described in FIG. 6(c) and FIG. 6(d).

FIG. 7 is a view describing the solidification status of the second reinforcing rib.

FIG. 7(a) shows the steering knuckle casting 120 (comparative example), and FIG. 7(b) is a view describing solidification times in a cross section taken along line b-b of FIG. 7(a).

In FIG. 7(b), the solidification time t1 in areas with diagonal lines is 10 to 16 seconds. A solidification time t3 in areas with countless dots is 16 to 18 seconds. A distance between the left area with the solidification time t3 and the right area with the solidification time t3 is denoted by D3.

Incidentally, since the second rib 132 is affected by the projecting portion 133 having a large heat capacity, the second rib 132 is much less likely to solidify than the first rib.

FIG. 7(c) shows the steering knuckle casting 20 (embodiment), and FIG. 7(d) is a view describing solidification times in a cross section taken along line d-d of FIG. 7(c).

In FIG. 7(d), the solidification time t1 in areas with diagonal lines is 10 to 16 seconds. The solidification time t3 in areas with countless dots is 16 to 18 seconds.

A distance between the left area with the solidification time t3 and the right area with the solidification time t3 is denoted by D4.

Incidentally, since the second rib 32 is affected by the projecting portion 33 having a large heat capacity, the second rib 32 is much less likely to solidify than the first rib.

The distance D4 is much smaller than the distance D3. In addition, in FIG. 7(d), the tips of the areas with the solidification time t3 form a V shape, and the division of the solidification direction is clear. On the other hand, in FIG. 7(b), the division of the solidification direction is not clear.

In FIG. 7(d), since the division of the solidification direction is clear, the unsolidified molten metal is pushed out to the first fastening portion 27 and the second fastening portion 28. As a result, a casting defect such as a cavity is less likely to remain in the first rib 31.

On the other hand, in FIG. 7(b), since the division of the solidification direction is not clear, a casting defect such as a cavity is likely to remain.

Namely, according to FIG. 7(c) and FIG. 7(d), solidification starts from the intermediate portion. As a result, by controlling the solidification directionality, a casting defect such as a shrinkage cavity is prevented from occurring in the product portion including the intermediate portion, and as a result, the internal quality is improved, the strength is secured, and the productivity is improved.

On the other hand, since the division of the solidification direction is not clear in the comparative example described in FIG. 7(a) and FIG. 7(b), the risk of a shrinkage cavity also occurring in the product portion remains compared to the embodiment described in FIG. 7(c) and FIG. 7(d).

In FIG. 6 and FIG. 7, there was a significant difference in solidification directionality between the comparative example and the embodiment. The reason for the occurrence of this difference will be estimated.

In FIG. 5 (comparative example), since the first rib 131 and the second rib 132 are parallel to each other, a longitudinal axis 131B of the first rib 131 is not directed toward a final solidification portion 129 in the plan portion 122. Similarly, a longitudinal axis 132B of the second rib 132 is not directed toward the final solidification portion 129 in the plan portion 122.

Some of the unsolidified molten metal moves toward the plan portion 122 along the longitudinal axes 131B and 132B, but does not move toward the final solidification portion 129. For that reason, as shown in FIG. 6(b) or FIG. 7(b), the division of the solidification direction is not clear.

On the other hand, in FIG. 4 (embodiment), the first rib 31 and the second rib 32 are disposed in a V shape, a longitudinal axis 31B of the first rib 31 is directed toward the final solidification portion 29, and a longitudinal axis 32B of the second rib 32 is directed toward the final solidification portion 29.

Some of the unsolidified molten metal moves toward the final solidification portion 29 along the longitudinal axes 31B and 32B. For that reason, as shown in FIG. 6(d) or FIG. 7(d), the division of the solidification direction is clear.

Next, the preferred sizes of the rib spacings W1 and W2 shown in FIG. 4 were investigated.

Models 1 to 4 were created by setting the rib spacing W1 to a ratio of "1.0" and setting the rib spacing W2 to a ratio in a range of 1.15 to 1.45, and the castability of Models 1 to 4 was investigated.

In Model 1, the rib spacing W1 was set to a ratio of 1.0, and the rib spacing W2 was set to a ratio of 1.15.

In Model 2, the rib spacing W1 was set to a ratio of 1.0, and the rib spacing W2 was set to a ratio of 1.28.

In Model 3, the rib spacing W1 was set to a ratio of 1.0, and the rib spacing W2 was set to a ratio of 1.33.

In Model 4, the rib spacing W1 was set to a ratio of 1.0, and the rib spacing W2 was set to a ratio of 1.45.

In Model 1, W2 was set to 1.15. Since the difference between W1 and W2 was small, the effect of a V shape was not exhibited, and an improvement in castability was small. The result is no good.

In Model 2, W2 was set to 1.28. The effect of a V shape was sufficiently exhibited, and good castability was obtained. The result is good.

In Model 3, W2 was set to 1.33. The effect of a V shape was sufficiently exhibited, and good castability was obtained. The result is good.

In Model 4, W2 was set to 1.45. The angle formed by a V shape is increased, which affected the flowability of the metal. The result is somewhat no good.

As a result, when the rib spacing W1 is set to a ratio of "1.0", it is recommended that the rib spacing W2 is set to a ratio in a range of 1.28 to 1.33.

Next, a more preferred embodiment will be described.

As shown in FIG. 8, the final solidification portion 29 is included in the plan portion 22, and an intersection point between the longitudinal axis 31B of the first rib 31 and the longitudinal axis 32B of the second rib 32 overlaps the final solidification portion 29. The intersection point does not need to be the center of the final solidification portion 29, and may be at an edge of the final solidification portion 29 as long as the intersection point is within the final solidification portion 29.

Since the unsolidified molten metal moves toward the final solidification portion 29 along the longitudinal axes 31B and 32B, the solidification directionality becomes clearer, and the occurrence of a casting defect can be more reliably avoided.

Incidentally, in the embodiment, the axle is fastened to the first fastening portion 27; however, an arm or a rod other than the axle may be fastened to the first fastening portion 27.

Similarly, in the embodiment, the damper is fastened to the second fastening portion 28; however, an arm or a rod other than the axle may be fastened to the second fastening portion 28.

INDUSTRIAL APPLICABILITY

The invention is suitable for the steering knuckle that holds a wheel.

EXPLANATIONS OF LETTERS OR NUMERALS

10 STEERING KNUCKLE
12 AXLE FASTENING PORTION
13 DAMPER FASTENING PORTION
16 FIRST REINFORCING RIB
17 SECOND REINFORCING RIB
20 STEERING KNUCKLE CASTING
21 MOLTEN METAL
22 PLAN PORTION
23 PRODUCT PORTION
24 SEPARATION LINE
26 INTERMEDIATE PORTION
27 FIRST FASTENING PORTION
28 SECOND FASTENING PORTION
29 FINAL SOLIDIFICATION PORTION
31 FIRST RIB
31B LONGITUDINAL AXIS OF FIRST RIB
32 SECOND RIB
32B LONGITUDINAL AXIS OF SECOND RIB
34 CENTER LINE
W1 RIB SPACING ON FIRST FASTENING PORTION SIDE
W2 RIB SPACING ON SECOND FASTENING PORTION SIDE

The invention claimed is:

1. A steering knuckle casting from which a steering knuckle as a product is obtained by performing machining on the steering knuckle casting,
    wherein the steering knuckle casting is a casting product including a plan portion and a product portion formed along a flow of molten metal, designed such that the product portion solidifies and then the plan portion solidifies, and obtained by separating the plan portion from the product portion after the solidification, sending the plan portion back to a remelting process, and performing the machining on the product portion,
    the product portion includes an intermediate portion, a first fastening portion integrally formed at one end of the intermediate portion and formed on a plan portion side, a second fastening portion integrally formed at the other end of the intermediate portion, and a first rib and a second rib integrally formed in the intermediate portion to extend from the first fastening portion to the second fastening portion, and
    the first rib and the second rib are not parallel to each other, and are disposed in a V shape such that a rib spacing on a first fastening portion side is narrower than a rib spacing on a second fastening portion side.

2. The steering knuckle casting according to claim 1, wherein the plan portion includes a final solidification portion that is most delayed in the solidification, and
    an intersection point between a longitudinal axis of the first rib and a longitudinal axis of the second rib overlaps the final solidification portion.

3. The steering knuckle casting according to claim 2, wherein the first fastening portion is a portion to which an axle is fastened, and
    the second fastening portion is a portion to which a damper is fastened.

4. The steering knuckle casting according to claim 1, wherein the first fastening portion is a portion to which an axle is fastened, and
    the second fastening portion is a portion to which a damper is fastened.

5. A steering knuckle comprising:
    a product intermediate portion;
    an axle fastening portion which is integrally formed at one end of the product intermediate portion, and to which an axle is fastened;
    a damper fastening portion which is integrally formed at the other end of the product intermediate portion, and to which a damper is fastened; and
    a first reinforcing rib and a second reinforcing rib integrally formed in the product intermediate portion to extend from the axle fastening portion to the damper fastening portion,
    wherein the first reinforcing rib and the second reinforcing rib are not parallel to each other, and are disposed in a V shape such that a rib spacing on an axle fastening portion side is narrower than a rib spacing on a damper fastening portion side.

* * * * *